United States Patent
Yamashita et al.

(10) Patent No.: US 8,988,491 B2
(45) Date of Patent: Mar. 24, 2015

(54) APPARATUS, SYSTEM, AND METHOD OF TRANSMITTING ENCODED IMAGE DATA, AND RECORDING MEDIUM STORING CONTROL PROGRAM

(75) Inventors: Tetsuo Yamashita, Kanagawa (JP);
Kohji Oshikiri, Kanagawa (JP);
Hiroomi Motohashi, Tokyo (JP);
Junichi Takami, Kanagawa (JP);
Yosuke Kawamura, Kanagawa (JP);
Noriyuki Shiota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 856 days.

(21) Appl. No.: 13/226,123

(22) Filed: Sep. 6, 2011

(65) Prior Publication Data
US 2012/0056975 A1   Mar. 8, 2012

(30) Foreign Application Priority Data

Sep. 7, 2010 (JP) ................... 2010-199833
Jul. 5, 2011 (JP) ................... 2011-148960

(51) Int. Cl.
*H04N 7/14* (2006.01)
(52) U.S. Cl.
CPC ..................... *H04N 7/148* (2013.01)
USPC ..................... 348/14.13; 348/14.09
(58) Field of Classification Search
USPC ............ 348/14.01, 14.08, 14.1, 14.12, 14.13, 348/14.09
See application file for complete search history.

(56) References Cited

U.S. PATENT DOCUMENTS

| | | | |
|---|---|---|---|
| 7,706,576 B1* | 4/2010 | Beck et al. ..................... | 382/118 |
| 8,218,831 B2* | 7/2012 | Tian et al. ..................... | 382/118 |
| 2002/0113862 A1* | 8/2002 | Center et al. ................. | 348/14.08 |
| 2004/0070666 A1* | 4/2004 | Bober et al. ................. | 348/14.01 |
| 2006/0215753 A1* | 9/2006 | Lee et al. .................. | 375/240.08 |
| 2007/0011239 A1 | 1/2007 | Fujioka | |
| 2010/0026781 A1* | 2/2010 | Ali et al. ..................... | 348/14.08 |

FOREIGN PATENT DOCUMENTS

| | | |
|---|---|---|
| JP | 2006-128997 | 5/2006 |
| JP | 2006-345361 | 12/2006 |
| JP | 2007-194823 | 8/2007 |

OTHER PUBLICATIONS

Rei Mochiki et al., "Robust Human Detection in a Complicated Background using Multiple Gaussian Mixture Skin Models" IEICE Technical Report, Oct. 2005, Engineers PRMU2005-99, The Institute of Electronics, Information and Communication, 16 Pages.

* cited by examiner

*Primary Examiner* — Olisa Anwah
(74) *Attorney, Agent, or Firm* — Oblon, McClelland, Maier & Neustadt, L.L.P.

(57) ABSTRACT

A communication terminal or system is provided with a processor that calculates a transmission data size that is suitable to a detected state of a network, and analyzes contents of image data for transmission to determine an image parameter that should be prioritized. The communication terminal or system encodes the image data for transmission into encoded image data, based on the calculated transmission data size and the image parameter that should be prioritized.

11 Claims, 6 Drawing Sheets ined detailed description with reference to the accompanying drawings,

APPARATUS, SYSTEM, AND METHOD OF TRANSMITTING ENCODED IMAGE DATA, AND RECORDING MEDIUM STORING CONTROL PROGRAM

CROSS-REFERENCE TO RELATED APPLICATIONS

This patent application is based on and claims priority under 35 U.S.C. §119 to Japanese Patent Application No. 2010-199833, filed on Sep. 7, 2010, and 2011-148960, filed on Jul. 5, 2011, in the Japan Patent Office, the entire disclosure of which is hereby incorporated herein by reference.

FIELD OF THE INVENTION

The present invention generally relates to an apparatus, system, and method of encoding image data and transmitting the encoded image data, and a recording medium storing a control program that causes an apparatus or system to encode image data and transmitting the encoded image data.

BACKGROUND

As described in Japanese Patent Application Publication No. 2007-194823, the recent videoconference systems detect a state of a network by exchanging information regarding a communication packet loss, a communication delay time, etc., through a server that relays image data between or among the terminals. Based on the detected network state, the recent videoconference systems change a resolution or a frame rate of image data for transmission, thus allowing image data to be transmitted in realtime even when the network is unstable.

FIG. 5 illustrates a configuration of a background videoconference system 100. The background videoconference system 100 includes a camera 110A, a display 112A, and a communication terminal 114A, which are provided at a first location site ("first site"). The background videoconference system 100 further includes a camera 110B, a display 112B, and a communication terminal 114B, which are provided at a second location site ("second site"). The background videoconference system 110 further includes a server 130 connected to the terminals 114A and 114B through a network 140 such that the server 130 relays data between the terminals 114A and 114B. The terminals 114A and 114B each include an encoder 116, a decoder 118, and a network state detector 120.

Referring to FIGS. 5 and 6, operation of transmitting image data from the terminal 114A to the terminal 114B, performed by the background videoconference system 100 of FIG. 5, is explained.

At S101, the network state detector 120A of the terminal 114A exchanges network state information D12 regarding an available communication band, a packet loss rate, etc. of the network 140 with the server 130 to detect the state of the network 140.

At S102, the network state detector 120A calculates a transmission data size that is suitable to the detected network state, and transmits information D13 regarding the calculated transmission data size to the encoder 116A.

At S103, the encoder 116A encodes image data D11 captured by the camera 110A by adjusting image parameters such that the encoded image data D14 has the suitable transmission data size. For example, the image data D11 is encoded such that the encoded image data D14 has a data size that is equal to or less than the suitable transmission data size.

At S104, the encoder 116A transmits the encoded image data D14 to the server 130 through the network 140.

At S105, the server 130 relays the encoded image data D14 received from the encoder 116A to the terminal 114B through the network 140, as relay image data D15.

At S106, the decoder 118B of the terminal 114B decodes the image data D15 into decoded image data D16.

At S107, the display 112B at the second site displays an image based on the decoded image data D16.

By repeating operation of FIG. 6, image data is exchanged between the remotely located sites to carry out videoconference. Further, the background videoconference system 100 adjusts image quality of the image data for transmission based on the network state, thus suppressing degradation in sound quality or delay in data transmission that may be otherwise caused when the network is unstable.

SUMMARY

The background videoconference system 100 of FIG. 5 changes encoding processing of image data for transmission mainly based on the detected network state. For this reasons, the encoder may encode the image data into encoded image data with low resolutions, even when the contents of the image data need to have high resolutions to keep image quality.

In view of the above, there is a need for an apparatus, system, and method of analyzing the contents of image data before encoding to determine which of image parameters should be prioritized, and encodes the image data into encoded image data such that the resultant encoded image data has a transmission data size suitable to the network state with a sufficient image quality as the highly prioritized image parameter is taken into account.

In addition to the above-described example embodiments, the present invention may be practiced in various other ways, for example, as a recording medium storing a control program that causes a computer to perform the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

The following example illustrates a videoconference system, which transmits or receives image data and/or voice data in realtime, between or among a plurality of communication terminals located at different sites through a relay device such as a server. As described below, the terminal analyzes the contents of image data for transmission to determine an image parameter that should be prioritized to keep a sufficient image quality of the contents, and encodes the image data while taking into account the prioritized image parameter.

Figure 1:
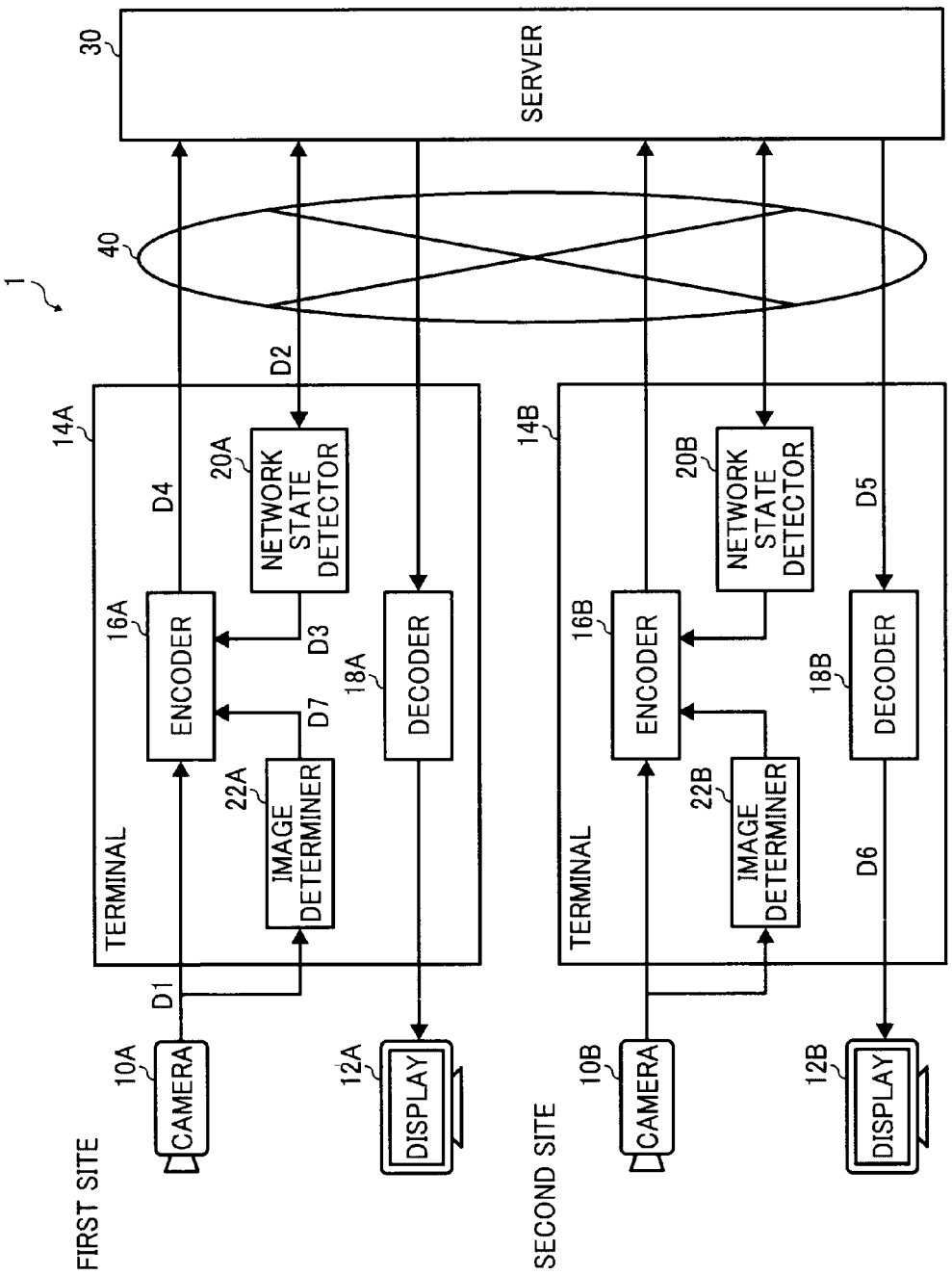
FIG. 1 is a configuration of a videoconference system, according to an example embodiment of the present invention.

FIG. 1 illustrates a configuration of a videoconference system, according to an example embodiment of the present invention. FIG. 1 specifically illustrates a portion of the videoconference system that is related to image data. For this reasons, transmission of other data such as voice data is omitted from the following description.

The videoconference system 1 of FIG. 1 includes a camera 10A, a display 12A, and a communication terminal ("terminal") 14A, each of which are provided at a first location site ("first site"), and a camera 10B, a display 12B, a communication terminal ("terminal") 14B, each of which are provided at a second location site ("second site"). The videoconference system 1 further includes a server 30 that relays data between the terminal 14A and the terminal 14B. The terminal 14A, the terminal 14B, and the server 30 are connected through a network 40 such as the Internet or the Intranet. For the descriptive purposes, in this example, the first location site is a site that transmits data to the second location site, and the second location site is a site that receives data from the first location site. However, the devices at the first location site and the devices at the second location site are similar in function and structure such that data may be transmitted in either way. For the descriptive purposes, in this example, the camera 10A and the camera 10B, the display 12A and the display 12B, the terminal 14A and the terminal 14B may be collectively referred to as the camera 10, the display 12, and the terminal 14, respectively.

The camera 10 captures an image of an object during videoconference. The image object may be a person who is participating the videoconference, any material for distribution at the videoconference, a part of the room where the videoconference takes place, etc. The display 12 displays an image of the other location site, which is transmitted from the terminal 14B through the server 30.

The terminal 14 transmits data such as image data to the other location site. The terminal 14 includes an encoder 16, a decoder 18, a network state detector 20, and an image determiner 22. The encoder 16 encodes the image data received from the camera 10, and transmits the encoded data to the other site through a communication device such as a network interface of FIG. 4. The decoder 18 decodes the image data received from the other site for display onto the display 12. The network state detector 20 monitors the state of the network 40 such as an available communication band or a packet loss, and transmits information regarding the transmission data size or the bit rate that is suitable to the detected network state to the encoder 16. The network state detector 20 may detect the network state, for example, as described in Japanese Patent Application Publication No. 2006-128997, the entire disclosure of which is hereby incorporated herein by reference. The image determiner 22 analyzes contents of the image data using the known image recognition method, and determines which of the image parameters of the image data should be prioritized to keep a sufficient level of the image quality after encoding. In this example, the image determiner 22 determines which of the resolution and the frame rate should be prioritized to keep a sufficient image quality of the contents of the image data.

The server 30 relays data such as image data between the terminals 14A and 14B through the network 40. The server 30 may be implemented by a general-purpose computer including a central processing unit (CPU), a memory such as a read only memory (ROM), random access memory (RAM), and a hard disk drive (HDD), and a communication interface such as a network interface. As illustrated in FIG. 1, the server 30 exchanges information regarding the network state with the terminal 14. More specifically, the server 30 is able to collect information regarding the state of the network 40 in the videoconference system 1 from a plurality of terminals 14 managed by the server 30. The server 30 stores in its memory the collected network state information. Based on the collected network state information, the server 30 sends information regarding the state of the network 40 to the terminal 14 when the terminal 14 requests for the network state information.

The image data D1 captured by the camera 10A at the first site, which is the transmission side, is input to the encoder 16A and the image determiner 22A. The terminal 14A at the transmission side encodes the image data D1 captured by the camera 10A using the encoder 16A, and transmits the encoded data D4 to the server 30 through the network 40. The server 30 relays the encoded data D4 received from the terminal 14A to the terminal 14B as the relay image data D5. The terminal 14B decodes the relay image data D5 using the decoder 18B into decoded data D6, and causes the display 12B to display an image based on the decoded data D6. In this manner, the image data is exchanged between the remotely located sites, thus carrying out videoconference between the sites.

The network state detector 20A of the terminal 14A at the transmission side exchanges network state information D2 regarding the state of the network 40 with the server 30. The network state detector 20A determines a transmission data size that is suitable to the network 40 using the network state information D2, and sends transmission data size information D3 regarding the transmission data size to the encoder 16A. The image determiner 22A analyzes the contents of the image data D1 received from the camera 10A, and determines which of a resolution and a frame rate is more important to keep a sufficient image quality level based on the contents of the image data D1. Based on the determination result, the image determiner 22A sends priority information D7 to the encoder 16A, which indicates the image parameter that should be prioritized. The encoder 16A encodes the image data D1 based on the transmission data size information D3 received from the network state detector 20A and the priority information D7 received from the image determiner 22A.

Figure 2:
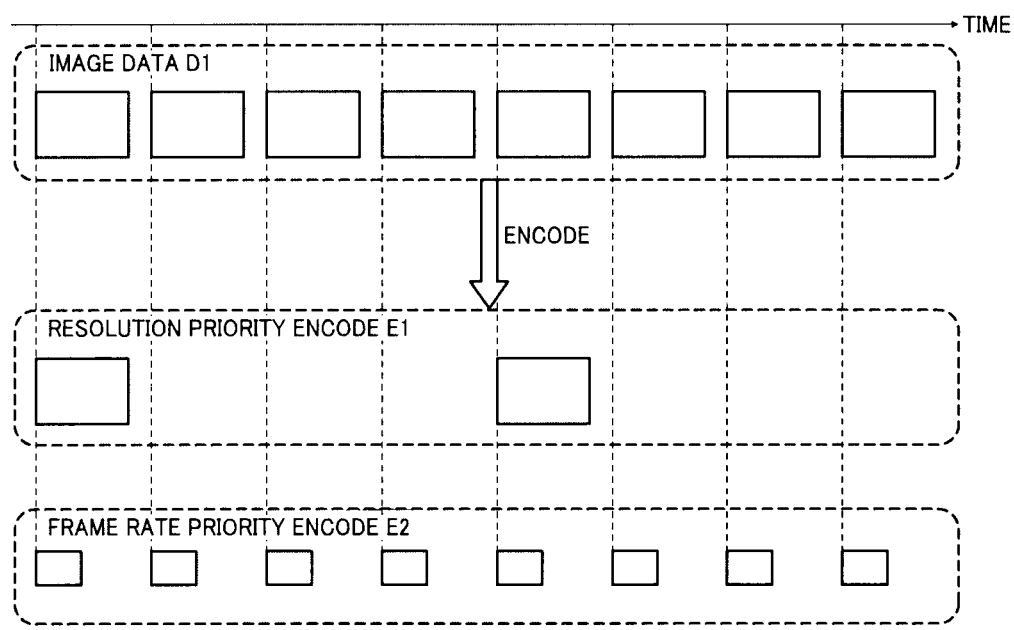
FIG. 2 is an illustration for explaining encoding of image data, performed by the videoconference system of FIG. 1.

FIG. 2 illustrates an image encoding method performed by the videoconference system of FIG. 1. Assuming that the image data D1 is encoded based on the priority information indicating that resolution should be prioritized, the encoder 16A encodes the image data D1 into resolution priority encoded data E1, by applying encoding processing that lowers the frame rate and keeps the same resolution. When the priority information indicating that a frame rate should be prioritized, the encoder 16A encodes the image data D1 into frame rate priority encoded data E2, by applying encoding processing that keeps the same frame rate and lowers the resolution. In this manner, even when the transmission data size is limited due to the unstable network state, the terminal 14 is able to transmit the image data while limiting the transmission data size, but still considering the image parameter that should be prioritized.

The image determiner 22A analyzes the contents of the image data using the known image recognition method such as a human detection method described in Mochiki, et al., "Robust Human Detection in a Complicated Background using Multiple Gaussian Mixture Skin Models", IEICE Technical Report, October 2005, pp. 37-42, PRMU2005-99, The Institute of Electronics, Information and communication engineers, Japan, the entire disclosure of which is hereby incorporated herein by reference.

Assuming that the human detection method is used, when the image determiner 22A detects a human object in the image, such as a human face, the image determiner 22A determines that the image data is an image having the human object such that capturing of a moving object is important, that is, a dominant characteristics of the contents. Based on this determination that capturing of the moving object is a dominant characteristic of the image contents, the image determiner 22A determines that an image parameter such as a frame rate of the image should be prioritized. Accordingly, the image determiner 22A instructs the encoder 16A to encode the image data while keeping the frame rate at sufficiently high levels.

On the other hand, when the image determiner 22A does not detect a human object in the image, the image determiner 22A determines that the image data is an image having a still object, such as scenery, such that capturing of a moving object is not a dominant characteristic of the image contents. Based on this determination, the image determiner 22A determines that an image parameter such as a resolution of the image should be prioritized. Accordingly, the image determiner 22A instructs the encoder 16A to encode the image data while keeping the resolution at sufficiently high levels.

Further, using the human detection method, the image determiner 22A may detect a number of human objects present in the image data, and determine whether a frame rate should be prioritized based on the detected number of human objects. More specifically, with the increased number of human objects, the image determiner 22A determines that capturing of a moving image would be more important such that the frame rate should be prioritized. With the decreased number of human objects, the image determiner 22A determines that capturing of a moving image would be less important such that the resolution of the image should be prioritized. The image determiner 22A may determine whether the counted number of human objects reaches a predetermined number, which is previously stored in a memory, to decide which of the image parameters should be prioritized.

Further, using the human detection method, the human object in the image data may be tracked to detect movements of the human object in the image data. When the image determiner 22A detects that the human object has moved between time frames, the image determiner 22A determines that the frame rate should be prioritized. When the image determiner 22A detects that the human object has not moved much between time frames, the image determiner 22A determines that the resolution should be prioritized.

For example, when the image determiner 22A detects that a number of human objects has increased or that the human object has moved between the currently processed image data and previously processed image data, the image determiner 22A causes the encoder 16A to prioritize the frame rate for the currently processed image data. When the image determiner 22A detects that a number of human object has decreased or that the human object has not moved between the currently processed image data and previously processed image data, the image determiner 22A causes the encoder 16A to prioritize the resolution for the currently processed image data. In order to determine the image parameter that should be prioritized, the image determiner may refer to a predetermined reference value to indicate a distance showing that the movement of the moving object is significant between the time frames.

Alternatively, the image determiner 22A may calculate a difference between the current frame and the previously generated frame, and determines whether an object has been moved based on the difference, without using the human detection method. In this manner, even when the human object is not detected in the image data, movement of an object in the image can be tracked to determine whether what image parameter should be prioritized.

Figure 3:
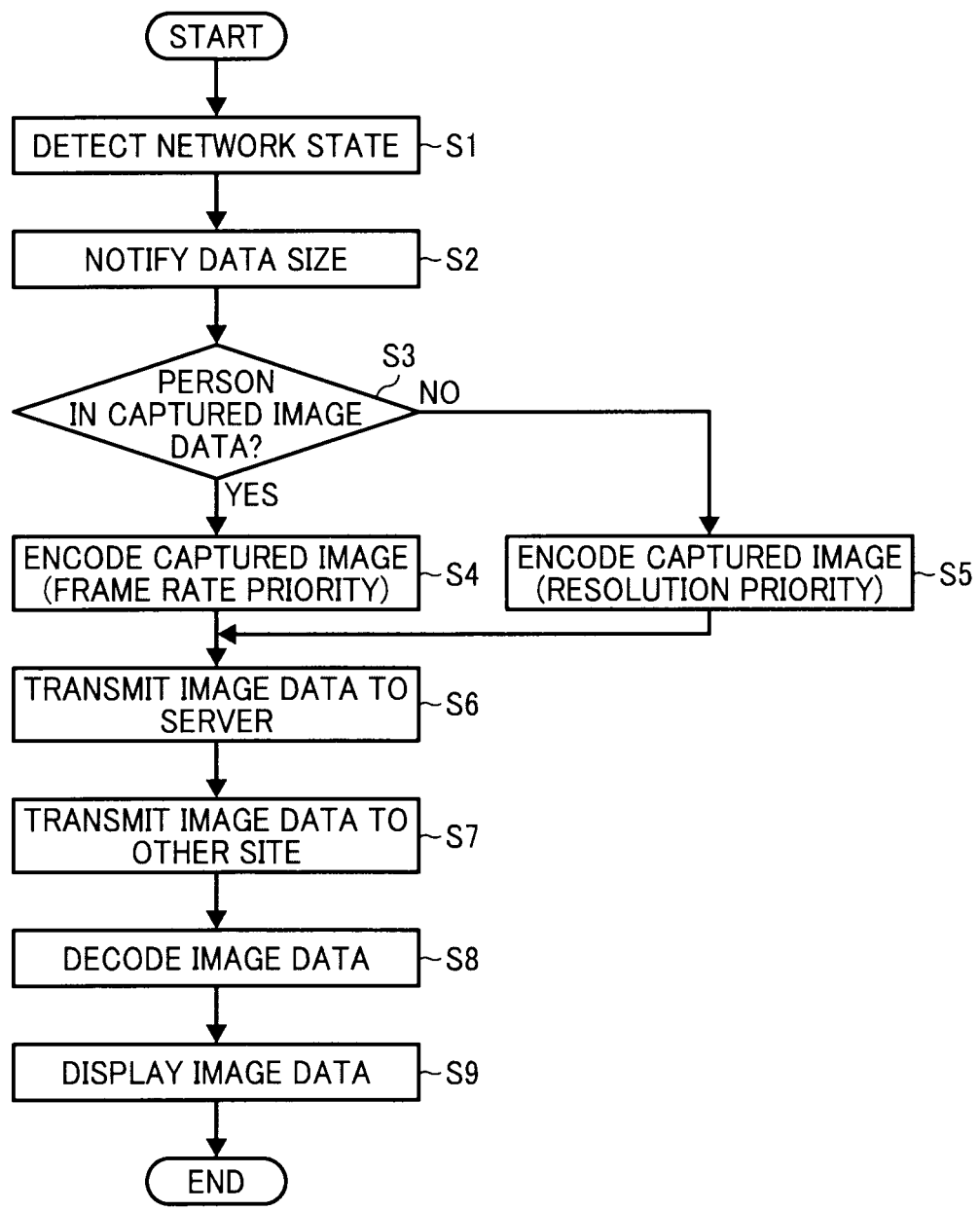
FIG. 3 is a flowchart illustrating operation of transmitting data from one site to the other site, performed by the videoconference system of FIG. 1, according to an example embodiment of the present invention.

Referring now to FIG. 3, operation of transmitting image data from the terminal 14A at the first site to the terminal 14B at the second site, performed by the videoconference system of FIG. 1, is explained according to an example embodiment of the present invention.

At S1, the network state detector 20A of the terminal 14A requests the server 30 for network state information D2 regarding the state of the network 40 to detect the state of the network 40. At this time, the network state detector 20A provides network state information regarding the state of the network 40 to the network state detector 20A. The network state information provided by the terminal 14A may be limited to information regarding its local network, such as LAN, as it is impossible for the terminal 14A to know the state of all network environments. Since the terminal 14A does not know about the network other than its local network, the terminal 14A requests the server 40 for such information regarding all other networks.

At S2, the network state detector 20A calculates a transmission data size that is suitable to the state of the network 40 that is indicated by the network state information D2, and transmits data size information D2 indicating the calculated transmission data size to the encoder 16A.

At S3, the image determiner 22A analyzes the contents of the image data D1 captured by the camera 10A. In this example, the image determiner 22A determines whether the contents of the image data D1 includes a human object, that is, an image of a person, using any desired human detection method.

At S4, when it is determined that the contents of the image data D1 includes a human object, that is, an image of a person ("YES" at S3), the image determiner 22A transmits priority information D7 indicating that a frame rate should be prioritized to the encoder 16A. The encoder 16A encodes the image data D1 into encoded image data D4 such that the encoded data D4 has the suitable transmission data size as specified by the data size information D2, but also has the sufficiently high frame rate as specified by the priority information D7.

At S5, when it is determined that the contents of the image data D1 does not include a human object, that is, a picture of a person ("NO" at S3), the image determiner 22A transmits priority information D7 indicating that a resolution should be prioritized to the encoder 16A. The encoder 16A encodes the image data D1 into encoded image data D4 such that the encoded image data D4 has the suitable transmission data size, but also has the sufficiently high resolution as specified by the priority information D7.

At S6, the encoder 16A transmits the encoded image data D4 to the server 30 through the network 40. More specifically, as described below referring to FIG. 4, the network I/F 41 transmits the encoded image data D4 to the server 30.

At S7, the server 30 transmits the encoded image data D4 generated by the encoder 16A of the terminal 14A to the terminal 14B at the second site, as the relay image data D5.

At S8, the decoder 18B of the terminal 14B decodes the image data D5 received from the server 30 into the decoded image data D6.

At S9, the terminal 14B causes the display 12B to display an image based on the decoded image data D6.

In this example, the image recognition method such as the human detection method that detects a human object in the image is used to analyze the contents of the image data. In alternative to or addition to the human detection method, the terminal 14 may use any other desired image recognition method depending on various image capturing conditions or the usage of the image data. Based on the contents of the image data that are analyzed, the image determiner 22 determines one or more image parameters that should be prioritized. In one example, the image determiner 22 may analyze the contents of the image data to determine whether capturing of a moving object is important, or a dominant characteristic of the contents, based on the contents of the image data. When it is determined that capturing of the moving object is important, the image determiner 22 determines that a frame rate should be prioritized. When it is determined that capturing of the moving object is not important, that is, capturing of a still object is more important, the image determiner 22 determines that a resolution should be prioritized.

As described above, the videoconference system 1 analyzes the contents of image data for transmission in addition to the network state of the network 40 to determine an encoding method that is suitable to the image data for transmission. When the contents of the image data indicates that a resolution is more important image parameter, the image data is encoded while keeping the resolution at high but suppressing the network load, for example, by lowering a frame rate. When the contents of the image data indicates that a frame rate is more important image parameter, the image data is encoded while keeping the frame rate at high but suppressing the resolution.

Such rules indicating what contents to be analyzed or how should be analyzed may be previously stored in a memory, for example, in the form of a terminal control program. Further, information indicating an available image parameter to be considered may be previously stored in a memory, for example, in the form of the terminal control program.

Figure 4:
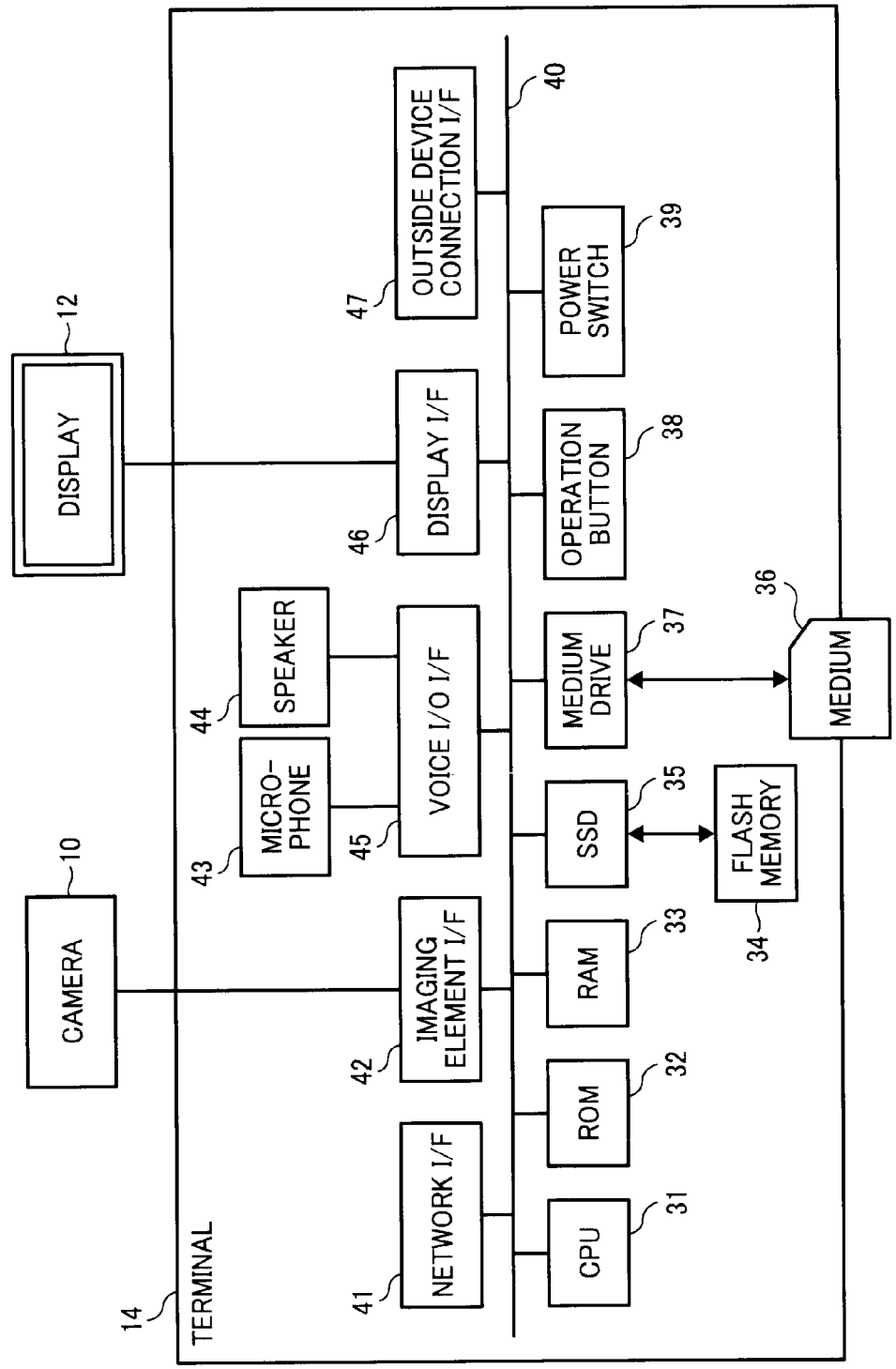
FIG. 4 is a schematic block diagram illustrating a structure of a communication terminal of the videoconference system of FIG. 1, according to an example embodiment of the present invention.
Figure 5:
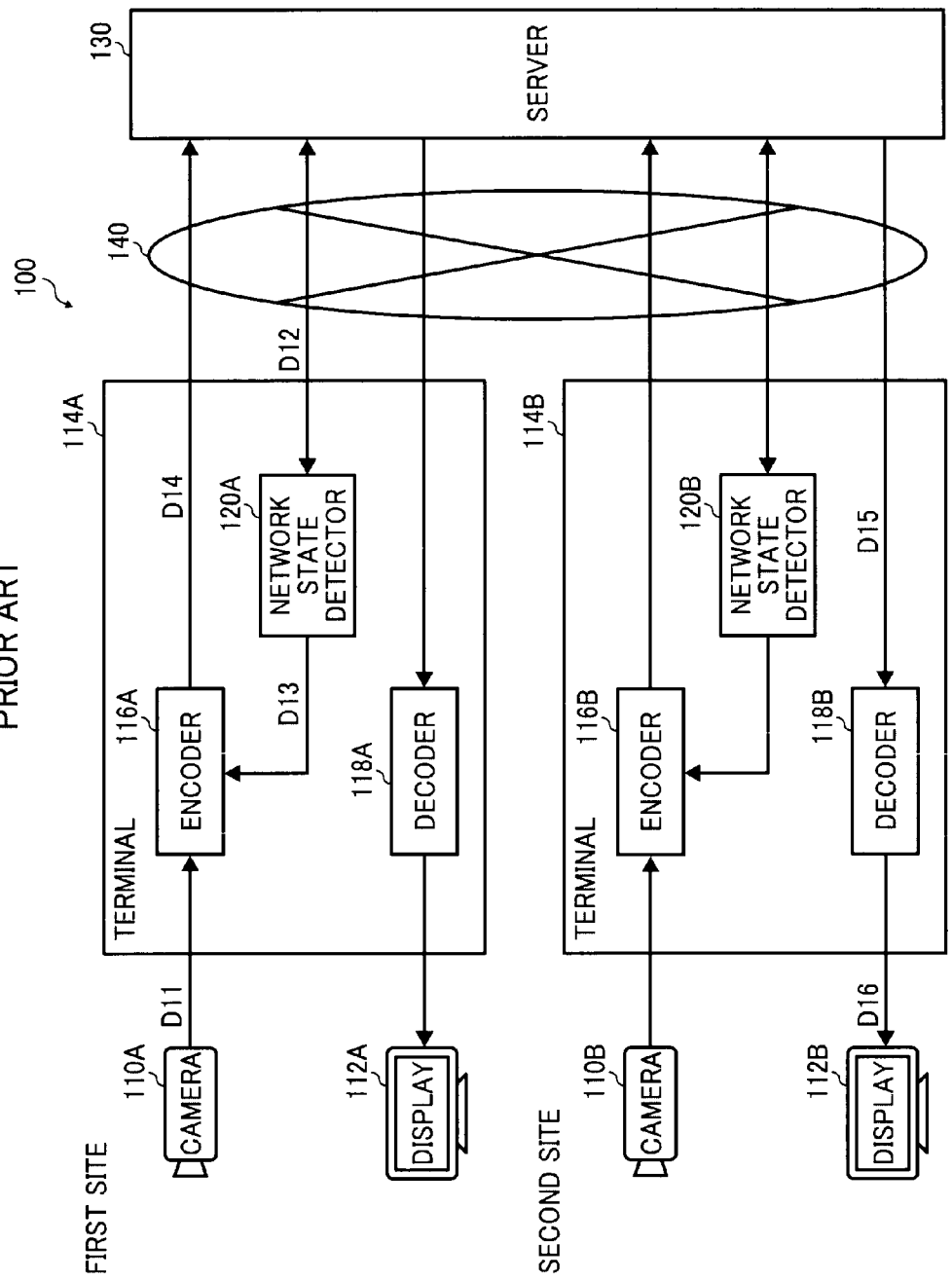
FIG. 5 is a configuration of a background videoconference system.
Figure 6:
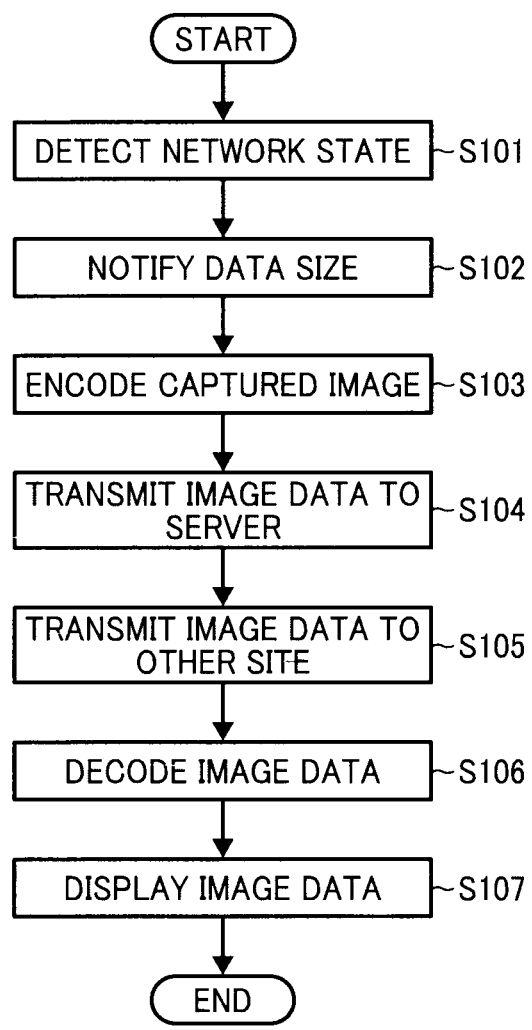
FIG. 6 is a flowchart illustrating operation of transmitting data from one site to the other site, performed by the background videoconference system of FIG. 4.

Referring now to FIG. 4, a structure of the communication terminal 14 is explained according to an example embodiment of the present invention. The terminal 14 includes a central processing unit (CPU) 31, a read only memory (ROM) 32, a random access memory (RAM) 33, a flash memory 34, a solid state drive (SSD) 35, a medium drive 37, an operation button 38, a power switch 39, a network interface (I/F) 41, an imaging element interface (I/F) 42, a microphone 43, a speaker 44, a voice input/output interface (I/O I/F) 45, a display interface (I/F) 46, and an outside device connection interface (I/F) 47, which are electrically connected through a bus 40 such as an address bus or data bus.

The CPU 31 controls entire operation of the terminal 14. The ROM 32 stores therein a control program for execution by the CPU 31, such as an initial program loader (IPL). The RAM 33 functions as a work area of the CPU 31. The flash memory 34 stores therein various data such as the terminal control program, image data, or voice data. The SSD 35 controls reading or writing of various data with respect to the flash memory 34 under control of the CPU 31. The medium drive 37 controls reading or writing of various data with respect to a removable recording medium 36 such as a flash memory. The operation button 38 allows the user to input a user instruction, for example, by allowing the user to select a communication destination such as the counterpart terminal 14. The power switch 39 allows the user to switch on or off the power of the terminal 14. The network I/F 41 allows the terminal 14 to transmit data through the network 40.

The camera 10 takes an image of an object to obtain image data under control of the CPU 31. The imaging element I/F 42 controls operation of the camera 10. In this example, the external camera 10 is connected to the terminal 14. Alternatively, the terminal 14 may be provided with an internal camera within the body of the terminal 14.

The microphone 43 catches sounds such as voice. The speaker 44 outputs sounds such as sounds generated based on voice. The voice I/O I/F 45 controls input or output of sound signals such as voice signals with respect to the microphone 43 and the speaker 44 under control of the CPU 31. The display I/F 46 transmits image data to the display 12 under control of the CPU 31. The outside device connection I/F 47 controls connection of the terminal 14 to various types of outside device.

The display 12 may be implemented by a liquid crystal display (LCD) or an organic light emitting display, which displays various data such as an image of an object or an operation icon. The display 120 may be connected to the display I/F 46 through a cable.

The camera 10 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The recording medium 36, which can be freely attached to or detached from the terminal 14, includes any desired type of recording medium. In alternative to the flash memory 34, any nonvolatile memory that is readable and writable under control of the CPU 31 may be used such as Electrically Erasable and Programmable ROM (EEPROM). The terminal control program may be written onto a recording medium that is readable by a general-purpose computer such as the recording medium 36 in any format that is installable or executable by a general-purpose computer. Once the terminal control program is written onto the recording medium, the recording medium may be distributed. Further, the terminal control program may be stored in any desired memory other than the flash memory 34, such as the ROM 32.

Upon execution of the CPU 31, the terminal control program is loaded onto the RAM 33 to cause the CPU 31 to perform operation of FIG. 3, using the devices of FIG. 4 that may function, in cooperation with the CPU 31, as the network state detector, image determiner, encoder, and decoder of FIG. 1.

While the above-described example case illustrates the case where the terminal 14 has the network state detector, image determiner, encoder, and decoder, any one of these functions may be performed by more than one device.

Further, the above-described method of encoding image data for transmission may be applicable to any desired apparatus or system, other than the videoconference system of FIG. 1.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: an image data communication system, which includes a first communication terminal that transmits image data, and a second communication terminal that receives the image data for display, which are connected through a network. The first communication terminal includes: a network state detector to detect a state of the network and calculate a transmission data size that is suitable to the state of the network; an image determiner to analyze the contents of the image data to determine an image parameter to be prioritized; and an encoder to encode the image data based on the transmission data size calculated by the network state detector and the image parameter determined by the image determiner.

In the communication system, the image determiner determines the contents of the image data using an image recognition method.

When the image determiner determines that capturing of a moving object contained in the image data is important, the image determiner determines that a frame rate is the image parameter that should be prioritized.

When the image determiner determines that capturing of a still object contained in the image data is important, the image determiner determines that a resolution is the image parameter that should be prioritized.

The present invention may reside in a method of transmitting image data, performed by an image data communication system including a first communication terminal that transmits image data, and a second communication terminal that receives the image data for display, which are connected through a network. The method includes the steps of: detecting a state of the network to calculate a transmission data size that is suitable to the network state; analyzing the contents of the image data to determine an image parameter to be prioritized; and encoding the image data based on the transmission data size and the image parameter.

As described above, the terminal analyzes the contents of the image data for transmission, and instructs the encoder to adjust the image data such that the image parameter that should be prioritized is considered. In addition to considering the network state, the contents of the image data for transmission is considered when encoding such that the resultant encoded image data has a sufficient level of image quality in terms of the image parameter that is important to the contents of the image data.

What is claimed is:

1. A communication terminal that communicates with a counterpart communication terminal through a network, the communication terminal comprising:
   a processor configured to:
      detect a state of the network and calculate a transmission data size that is suitable to the detected state of the network;
      receive image data captured by a capturing device and analyze contents of the image data to determine an image parameter that should be prioritized;
      encode the image data into encoded image data having a data size equal to or less than the calculated transmission data size by applying encoding processing that is determined based on the image parameter that should be prioritized; and
   a network interface configured to transmit the encoded image data to the counterpart communication terminal through the network, wherein
   the image parameter that should be prioritized is selected from a frame rate of the image data and a resolution of the image data, and
   the processor applies encoding processing that keeps a sufficient level of frame rate when the frame rate is selected as the image parameter that should be prioritized, and applies encoding processing that keeps a sufficient level of resolution when the resolution is selected as the image parameter that should be prioritized.

2. The communication terminal of claim 1, wherein the processor analyzes the contents of the image data using an image recognition method.

3. The communication terminal of claim 2, wherein the image recognition method includes a human detection method of detecting a human object in the image data.

4. The communication terminal of claim 1, wherein the processor is further configured to:
   analyze whether capturing of a moving object in the image data is a dominant characteristic of the contents of the image data; and
   determine that the frame rate is the image parameter that should be prioritized when capturing of the moving object is a dominant characteristic, and that the resolution is the image parameter that should be prioritized when capturing of the moving object is not a dominant characteristic.

5. The communication terminal of claim 1, wherein the processor is further configured to:
   count a number of moving objects in the image data; and
   determine that the frame rate of the image data is the image parameter that should be prioritized when the counted number of moving objects reaches a predetermined number, and that the resolution of the image data is the image parameter that should be prioritized when the counted number of moving objects does not reach the predetermined number.

6. The communication terminal of claim 1, wherein the processor is further configured to:
analyze whether the movement of a moving object is significant between image data that is previously analyzed by the processor and the image data that is currently analyzed by the processor; and
determine that the frame rate is the image parameter that should be prioritized when the movement of the moving object is significant, and that the resolution is the image parameter that should be prioritized when the movement of the moving object is not significant.

7. A communication system, comprising:
a first communication terminal;
a second communication terminal connected to the first communication terminal through a network; and
a server apparatus connected to the first communication terminal and the second communication terminal through the network and to relay data between the first communication terminal and the second communication terminal, wherein
the first communication terminal includes:
a network state detector configured to detect a state of the network based on network state information received from the server apparatus, and calculate a transmission data size that is suitable to the detected state of the network;
an image determiner to receive image data captured by a capturing device and analyze contents of the image data to determine an image parameter that should be prioritized;
an encoder to encode the image data into encoded image data having a data size equal to or less than the calculated transmission data size by applying encoding processing that is determined based on the image parameter that should be prioritized; and
a network interface configured to transmit the encoded image data to the server apparatus through the network, and
the second communication terminal includes:
a network interface configured to receive the encoded image data from the server apparatus through the network; and
a decoder to decode the encoded image data into decoded image data for display onto a display device, wherein
the image parameter that should be prioritized is selected from a frame rate of the image data and a resolution of the image data, and
the encoder of the first communication terminal applies encoding processing that keeps a sufficient level of frame rate when the frame rate is selected as the image parameter that should be prioritized, and applies encoding processing that keeps a sufficient level of resolution when the resolution is selected as the image parameter that should be prioritized.

8. The communication system of claim 7, wherein the image determiner of the first communication terminal is further configured to:
analyze whether capturing of a moving object in the image data is a dominant characteristic of the contents of the image data; and
determine that the frame rate is the image parameter that should be prioritized when capturing of the moving object is a dominant characteristic, and that the resolution is the image parameter that should be prioritized when capturing of the moving object is not a dominant characteristic.

9. A method of communicating image data with a counterpart communication terminal through a network, the method comprising:
detecting a state of the network;
calculating a transmission data size that is suitable to the detected state of the network;
receiving image data captured by a capturing device;
analyzing contents of the image data to determine an image parameter that should be prioritized;
encoding the image data into encoded image data having a data size equal to or less than the calculated transmission data size by applying encoding processing that is determined based on the image parameter that should be prioritized; and
transmitting the encoded image data to the counterpart communication terminal through the network, wherein
the method further comprises
selecting the image parameter that should be prioritized from a frame rate of the image data and a resolution of the image data; and
applying encoding processing that keeps a sufficient level of frame rate when the frame rate is selected as the image parameter that should be prioritized; and
applying encoding processing that keeps a sufficient level of resolution when the resolution is selected as the image parameter that should be prioritized.

10. The method of claim 9, wherein the detecting a state of the network comprises:
receiving network state information indicating the state of the network from a server apparatus through the network.

11. The method of claim 9, further comprising:
analyzing whether capturing of a moving object in the image data is a dominant characteristic of the contents of the image data; and
determining that the frame rate is the image parameter that should be prioritized when capturing of the moving object is a dominant characteristic, and that the resolution is the image parameter that should be prioritized when capturing of the moving object is not a dominant characteristic.

* * * * *